(12) United States Patent
Cesana et al.

(10) Patent No.: US 6,466,220 B1
(45) Date of Patent: Oct. 15, 2002

(54) GRAPHICS ENGINE ARCHITECTURE

(75) Inventors: Joseph F. Cesana, Palo Alto; Peter Trajmar; Edward Wang, both of San Jose; Hank Guo, Cupertino; Steve Chiou, Saratoga; Bruce K. Holmer, Belmont; David Auld, San Jose, all of CA (US)

(73) Assignee: Teralogic, Inc., Mountain View, CA (US)

( * ) Notice: Subject to any disclaimer, the term of this patent is extended or adjusted under 35 U.S.C. 154(b) by 0 days.

(21) Appl. No.: 09/263,161

(22) Filed: Mar. 5, 1999

(51) Int. Cl.[7] .............................................. G06F 13/00
(52) U.S. Cl. ........................ 345/537; 345/548; 345/603
(58) Field of Search ................................. 345/511, 514, 345/515, 507, 508, 548, 536, 537, 546, 564, 603, 604, 605

(56) References Cited

U.S. PATENT DOCUMENTS

| | | | | |
|---|---|---|---|---|
| 5,559,954 A | * | 9/1996 | Sakoda et al. ............... | 395/507 |
| 5,699,067 A | * | 12/1997 | Brown et al. ................ | 342/176 |
| 5,742,797 A | * | 4/1998 | Celi, Jr. et al. .............. | 345/507 |
| 5,745,119 A | * | 4/1998 | Parchem et al. ............. | 345/431 |
| 5,751,979 A | * | 5/1998 | McCrory ..................... | 345/343 |
| 5,936,641 A | * | 8/1999 | Jain et al. .................... | 345/503 |

* cited by examiner

Primary Examiner—Mark Zimmerman
Assistant Examiner—Mackly Monestime
(74) Attorney, Agent, or Firm—Blakely, Sokoloff, Taylor & Zafman LLP

(57) ABSTRACT

A method and apparatus for display of graphical data is described. The invention provides an architecture for graphics processing. The architecture includes pipelined processing and support for multi-regional graphics. In one embodiment, a graphics driver according to the invention can receive multiple independent streams of graphical data that can be in different graphical formats. The independent streams are synchronized and converted to a common format prior to being processed. In one embodiment, multi-regional graphics are supported with off-screen and on-screen memory regions for processing. The regions of the multi-regional graphic are rendered in an off-screen memory. The data in the off-screen memory are converted to a common format and copied to on-screen memory. The data in the on-screen memory is used to generate an output image. Alpha blending can also be programmed to provide multi-regional graphics or other graphical features. In one embodiment, graphics processing is programmable and can be paced using a set of registers.

15 Claims, 14 Drawing Sheets

GRAPHICS ENGINE ARCHITECTURE

FIELD OF THE INVENTION

The invention relates to devices related to display of graphical data. More particularly, the invention relates to a pipelined graphics engine architecture.

BACKGROUND OF THE INVENTION

Many different types of devices have been used to display graphics. Because graphics have been used for different purposes with different methods of distribution, many different graphics formats have been developed. For example, analog televisions receive graphical information in a different format than computer systems, which have multiple formats for graphical information.

However, as various technologies and electronics devices converge, for example, accessing the Internet via a television, graphical information is converted between formats. In order to further support convergence of technologies, further support of multiple graphical formats is desirable. For example, multi-regional graphics allows information from multiple sources that is provided in multiple formats to be displayed as a single image.

Multi-regional graphics are graphics that are displayed as a single image where different regions have different graphical formats (e.g., index, RGB with or without alpha blending, YUV). In other words, support of multi-regional graphics is the ability to simultaneously display several graphical regions with different characteristics. Multi-regional graphics capability is useful, for example, for a television set-top box for accessing the Internet. However, multi-regional graphics exceeds the current capabilities of typical display controllers.

Therefore, what is needed is an improved graphics display controller capable of supporting multi-regional graphics and providing other graphical features.

SUMMARY OF THE INVENTION

A method and apparatus for display of graphical data is described. A multi-regional image having at least two regions represented by at least two color formats is rendered in an off-screen memory. The multi-regional image is copied to an on-screen memory. The regions of the multi-regional image are converted to a common color format during the copy operation. The multi-regional image stored in the on-screen memory is displayed.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

A method and apparatus for display of graphical data is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The invention provides an architecture for graphics processing. The architecture includes pipelined processing and support for multi-regional graphics. In one embodiment, a graphics driver according to the invention can receive multiple (e.g., 3) independent streams of graphical data that can be in different graphical formats. The independent streams are synchronized and converted to a common destination format prior to being processed.

In one embodiment, multi-regional graphics are supported with off-screen and on-screen memory regions for processing. The regions of the multi-regional graphic are rendered in an off-screen memory. The data in the off-screen memory are converted to a common format and copied to on-screen memory. The data in the on-screen memory is used to generate an output image. Alpha blending can also be programmed to provide varying levels of transparency or other graphical features. In one embodiment, graphics processing is programmable and can be paced in response to video display events.

Overview of a Graphical Display Architecture

Figure 1:
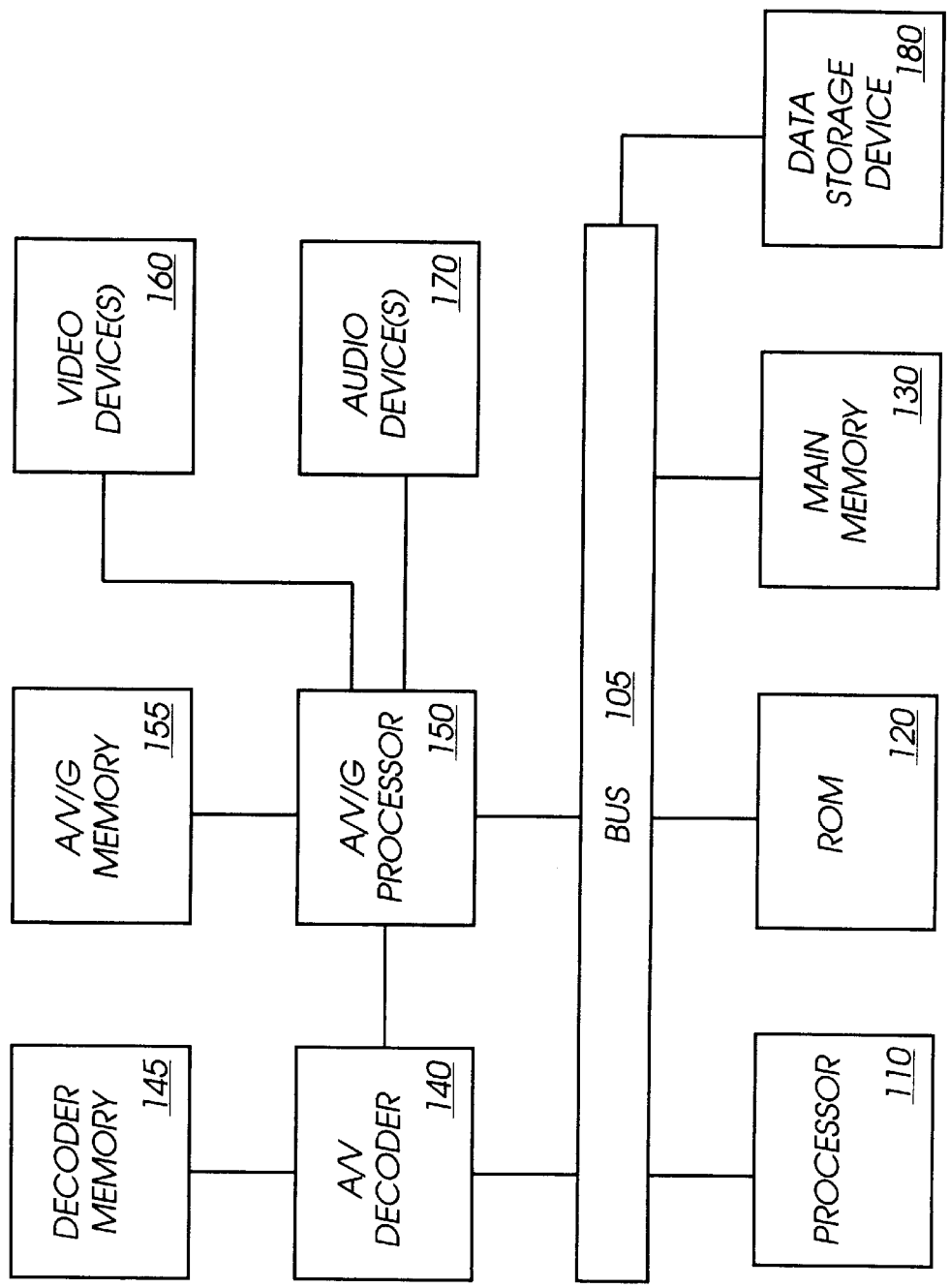
FIG. 1 is one embodiment a system suitable for use with the invention.

FIG. 1 is one embodiment of a system suitable for use with the invention. System 100 includes bus 105 or other communication device to communicate information and processor 110 (also referred to as a CPU in some embodiments) coupled to bus 105 to process information. While system 100 is illustrated with a single processor, system 100 can include multiple processors. System 100 further includes main memory 130 that can be random access memory (RAM) or other dynamic storage device, coupled to bus 105 to store information and instructions to be executed by processor 105. Main memory 130 also can be used for storing temporary variables or other intermediate information during execution of instructions by processor 110.

System 100 also includes read only memory (ROM) and/or other static storage device 120 coupled to bus 105 to store static information and instructions for processor 105. Data storage device 180 is coupled to bus 105 to store information and instructions. Data storage device 180 such as a magnetic disk or optical disc and corresponding drive can be coupled to system 100.

Audio/visual/graphics (A/V/G) decoder 140 is coupled to bus 105 to receive A/V/G data. A/V decoder 140 can also receive data directly. In one embodiment, A/V decoder 140 is an MPEG decoder that decodes digital A/V/G data according to one of the Motion Picture Experts Group standards (e.g., MPEG-1, MPEG-2, MPEG-4, MPEG-J, MPEG-2000). A/V decoder 140 can also be an analog decoder that decodes A/V/G data according to the national Television Standards Committee (NTSC) and/or Phase Alternation Line (PAL) and/or Séquentiel Couleurs à Mémoire (SECAM) standards. Of course, other data communications standards can also be used. In one embodiment, decoder memory 145 is coupled to A/V decoder 140 for use in decoding A/V data. In alternative embodiments A/V decoder 140 does not have a dedicated memory.

A/V/G processor 150 is coupled to A/V decoder 140 to receive the output of A/V decoder 140. A/V decoder 140 provides A/V/G processor 150 with one or more video data inputs and/or one or more audio data inputs. A/V/G processor 150 is also coupled to bus 105 to communicate with processor 105 and other components of system 100. A/V/G processor 150 can also be coupled to multiple A/V/G decoders (not shown in FIG. 1).

In one embodiment, A/V/G memory 155 is coupled to A/V/G processor 150. A/V/G memory 155 is used for A/V/G processing as described in greater detail below. In an alternative embodiment, A/V/G processor 150 uses main memory 130 for A/V/G processing rather than A/V/G memory 155.

Video device(s) 160 and audio device(s) 170 are coupled to A/V/G processor 150. Video device(s) 160 represents one or more devices configured to display video or other graphical data output by A/V/G processor 150. Similarly, audio device(s) 170 represent one or more devices configured to generate audio output based on audio data generated by A/V/G processor 150. In one embodiment, A/V/G processor 150 generates two video output channels corresponding to multi-regional graphics and video in one channel and background video on a second channel; however, other configurations can also be provided. A/V/G processor also generates one or more audio output channels based, at least in part, on corresponding input audio channels.

One embodiment of the present invention is related to the use of system 100 to provide processing of graphical information. According to one embodiment, processing of graphical information is performed by system 100 in response to processor 105 executing sequences of instructions contained in main memory 130. Processing of graphical information can also be performed in response to A/V/G processor 150 executing sequences of instructions stored in main memory 130 or A/V/G memory 155.

Instructions are provided to main memory 130 from a storage device, such as magnetic disk, a ROM integrated circuit, CD-ROM, DVD, via a remote connection (e.g., over a network), etc. In alternative embodiments, hard-wired circuitry can be used in place of or in combination with software instructions to implement the present invention. Thus, the present invention is not limited to any specific combination of hardware circuitry and software instructions.

Overview of a Pipelined Architecture for Graphical Processing

In one embodiment, data input streams are scanned according to the standard progressive sequence used in NTSC and PAL encoding. In other words, an image is scanned starting from the pixel in the top left corner horizontally across to the pixel in the top right corner of the image. The next line down in the image is scanned from left to right. This scanning pattern is repeated until the image is completely scanned. When multiple data streams are received for processing, the streams can have different widths in pixels; however, in one embodiment the various images start from the same pixel location (e.g., top left corner of the image).

Figure 2:
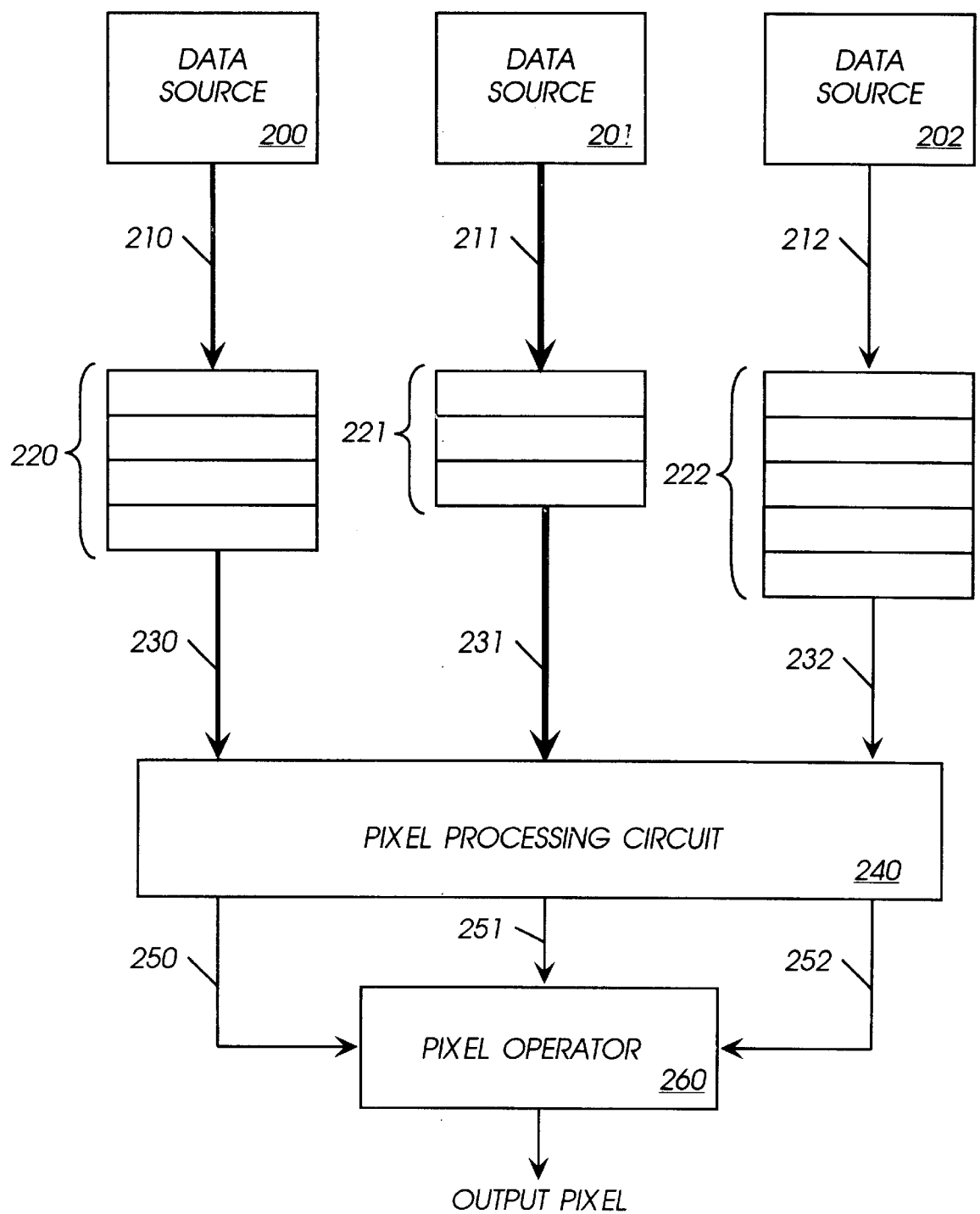
FIG. 2 illustrates a general data flow of data to be processed according to the invention.

FIG. 2 illustrates a general data flow of data to be processed according to the invention. In the example of FIG. 2, data rates are illustrated with arrow widths. The wider the arrow, the higher the data rate. One or more of the elements of FIG. 2 can be included in A/V/G processor 150.

Data sources 200, 201 and 202 represent sources of A/V data to be processed. The data sources can be, for example, analog television channels, digital television channels, DVD players, VCRs. The data stream provided by each data source can vary from the other sources depending on, for example, data format. Varying data rates are common due to color formats having different bits per pixel. For example, 8-bit color indexed format requires and 8-bit value to represent a pixel. Thus, four pixels can be transferred through a 32-bit wide data path in a single clock cycle. However, 32-bit RGB color format requires all 32 bits to represent a single pixel. Thus, only a single pixel can be transferred through a 32-bit wide data path in a single clock cycle.

In addition to varying data rates for different color formats, conversion of one or more data streams to a common format can cause different latencies based on the conversions performed. For example, conversion from indexed color formats to RGB color formats require retrieving a value from a look up table, the latency for which can vary depending on the location of the value in the table. The corresponding conversion latency varies in response to the look up latency. The example of FIG. 2 assumes that data stream 210 is graphical data in a first format where the data rate is 1 Mbyte/sec., data stream 211 is graphical data in a second format where the data rate is 2 Mbyte/sec., and data stream 212 is graphical data in a third format where the data rate is 0.3 Mbyte/sec. However, these data rates are not required by the invention.

Because of the varying data rates and conversion latencies, the pipeline depth associated with each data stream varies also. In the example of FIG. 2, pipeline 220 has a longer latency (represented by a number of stages) than pipeline 221. Similarly, pipeline 222 has a longer latency than either pipeline 220 or 221. Data streams 230, 231 and 232 are output from pipelines 220, 221 and 222, respectively and provide input to pixel processing circuit 240.

Pixel processing circuit 240 operates on pixels received via data streams 230, 231 and 232. However, because data streams 230, 231 and 232 have different data rates, the arrival of pixel data at pixel processing circuit 240 is not synchronized. In order to generate an accurate output pixel based on multiple input pixels, the pixels must, at some point in processing, be synchronized. Pixel processing circuit 240 operates on data streams 230, 231 and 232 to synchronize the pixels received.

Pixel processing circuit 240 performs one or more operations (e.g., boolean operations, alpha blending) on the pixels received from the pixel source buffers to generate an output pixel. Pixel operator 260 receives synchronized pixels from pixel control circuit 240 via pixel streams 250, 251 and 252. The output pixel is used to generate an output image.

In one embodiment, the components of FIG. 2 include pixel mirroring circuitry. The pixel mirroring circuitry allows pixel processing that is independent of the horizontal scanning direction. In one embodiment, pixel source buffers included in pipelines 220, 221 and 222 perform mirroring operations when necessary on data streams received. Pixel operator 260 reverses the mirroring operations when necessary to generate an output pixel.

Pixel mirroring allows operations performed by pixel processing circuit 240 to be the same for images that are processed from right to left and for images that are processed from left to right. The use of the same operations for right to left processing and left to right processing reduces the size and complexity of pixel processing circuit 240 as compared to a circuit designed for processing images both right to left and left to right. The ability to perform both right to left and left to right scanning is useful, for example, when overlapping images are processed.

In one embodiment mirroring is accomplished by a set of multiplexors included in the pixel source buffers of pipelines 220, 221 and 222; however, mirroring can be accomplished by different circuitry. Pixel mirroring reverses the order of pixels received by the pixel source buffers. The reversal of pixel ordering allows right to left scanned images to be processed with the same operations as used for left to right scanned images because the scanning order is effectively reversed by the pipeline circuitry.

For example, if a 32-bit data stream provides four 8-bit pixels, the mirroring circuitry reverses the order of the pixels received. In other words, the order of the first, second, third, and fourth pixels received as a single 32-bit word are processed by pixel processing circuit 240 as if scanned in the order of fourth, third, second, and first pixels. In one embodiment, pixel operator 260 includes circuitry to reverse the mirroring performed by the pipeline circuitry. If a mirrored image is desired pixel operator 260 does not reverse the mirroring performed by the pipeline circuitry.

In one embodiment, pixel mirroring is supported for multiple pixel widths. For example, if a 32-bit data path is communicating 1-bit color coded pixels, the order of the bits received are reversed in a bitwise manner rather than reversing the order of bytes that are received as a 32-bit word.

Synchronization of Multiple Independent Data Streams

Figure 3:
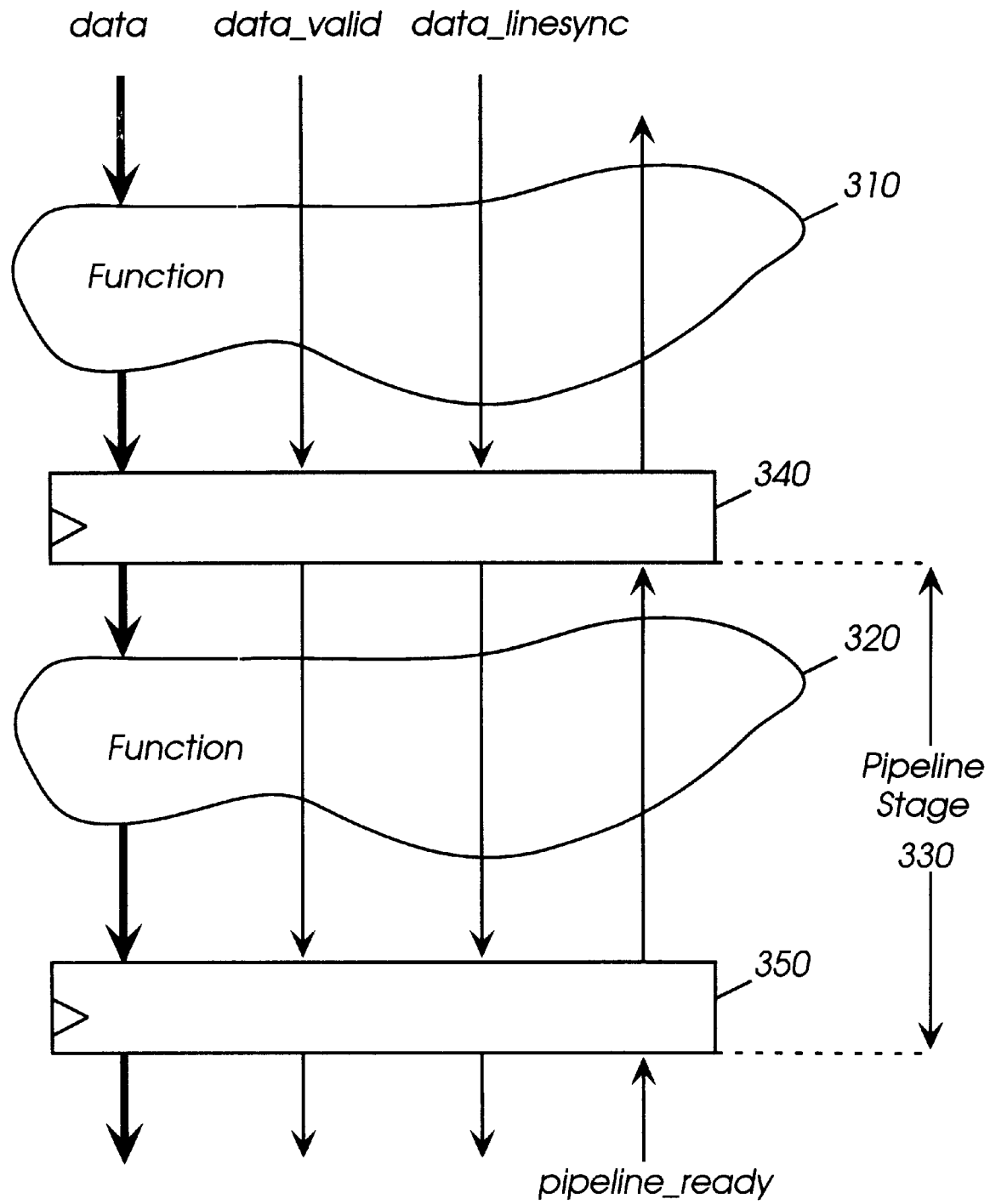
FIG. 3 is a conceptual diagram of data flow for synchronizing data streams according to one embodiment of the invention.

FIG. 3 is a conceptual diagram of data flow for synchronizing data streams according to one embodiment of the invention. The flow control described with respect to FIG. 3 provides three basic functions that can be used to synchronize independent data streams. The flow control functions are: 1) the ability to independently halt any channel at any time; 2) the ability to identify which cycles contains a pipeline bubble; and 3) the ability to mark the boundary of a region of interest. Additional and/or different functions can also be provided for flow control or other purposes.

The description with respect to FIG. 3 is related to a single pipeline stage (labeled pipeline stage 330), however, the description is equally applicable to pipelines having multiple stages. In general, function 310 operates on data received and provides the result to register 340. Pipeline stage 330 corresponds to function 320 that operates on data received from register 340 to generate output data that is stored in register 350.

Under certain circumstances, a data stream may be stalled because the stream may be ahead of other streams. In one embodiment, a synchronization signal, labeled PIPELINE_READY in FIG. 3, is provided to each pipeline stage processing a particular data stream. The PIPELINE_READY signal can be generated, for example, by pixel control circuit 240. In one embodiment, when PIPELINE_READY is deasserted, all pipeline stages prior to the pipeline stage in which the signal is asserted are halted, unless pipeline bubbles are detected. Pipeline bubbles are described in greater detail below. When PIPELINE_READY is asserted data from a previous pipeline stage is accepted and assumed valid.

A pipeline bubble exists when a pipeline stage contains invalid data. In order to improve overall performance, it is desirable to reduce the number of pipeline bubbles as much as possible. Bubbles can be injected into the pipeline, for example, during an idle stage or between data streams having different data rates. Identifying and eliminating pipeline bubbles provides functional correctness and the ability to accelerate pipeline throughput.

Elimination bubbles is the exception to the use of the PIPELINE_READY signal described above. When a bubble is detected in a current pipeline stage, all prior stages in the pipeline have the respective PIPELINE_READY signals asserted regardless of actual state. This allows data in the pipeline to advance, thereby removing the bubble from the pipeline.

In one embodiment, identification of pipeline bubbles is accomplished with a data validity signal, labeled DATA_VALID in FIG. 3. When the DATA_VALID signal is deasserted, the associated pipeline stage contains a bubble. When the DATA_VALID signal is asserted, the associated pipeline stage is processed in the normal manner.

When multiple data sources describe images of different sizes, a region of interest is defined for processing purposes. In one embodiment, the region of interest is the maximum subset area of all active images. In other words, the region of interest is the largest area that all images have in common. Other regions of interest can also be defined. In one embodiment a region of interest signal, labeled DATA_LINESYNC, is used to indicate an end of an region of interest. When the DATA_LINESYNC signal is asserted, the associated pixel is the last pixel of a horizontal line. Subsequent pixels for the line are discarded.

A control mechanism, for example, pixel control circuit 240, uses the signals described above to control pixel flow and synchronize independent data streams. This includes the ability to discard pixels that are outside the region of interest. This also enables elimination of pipeline bubbles.

Figure 4:
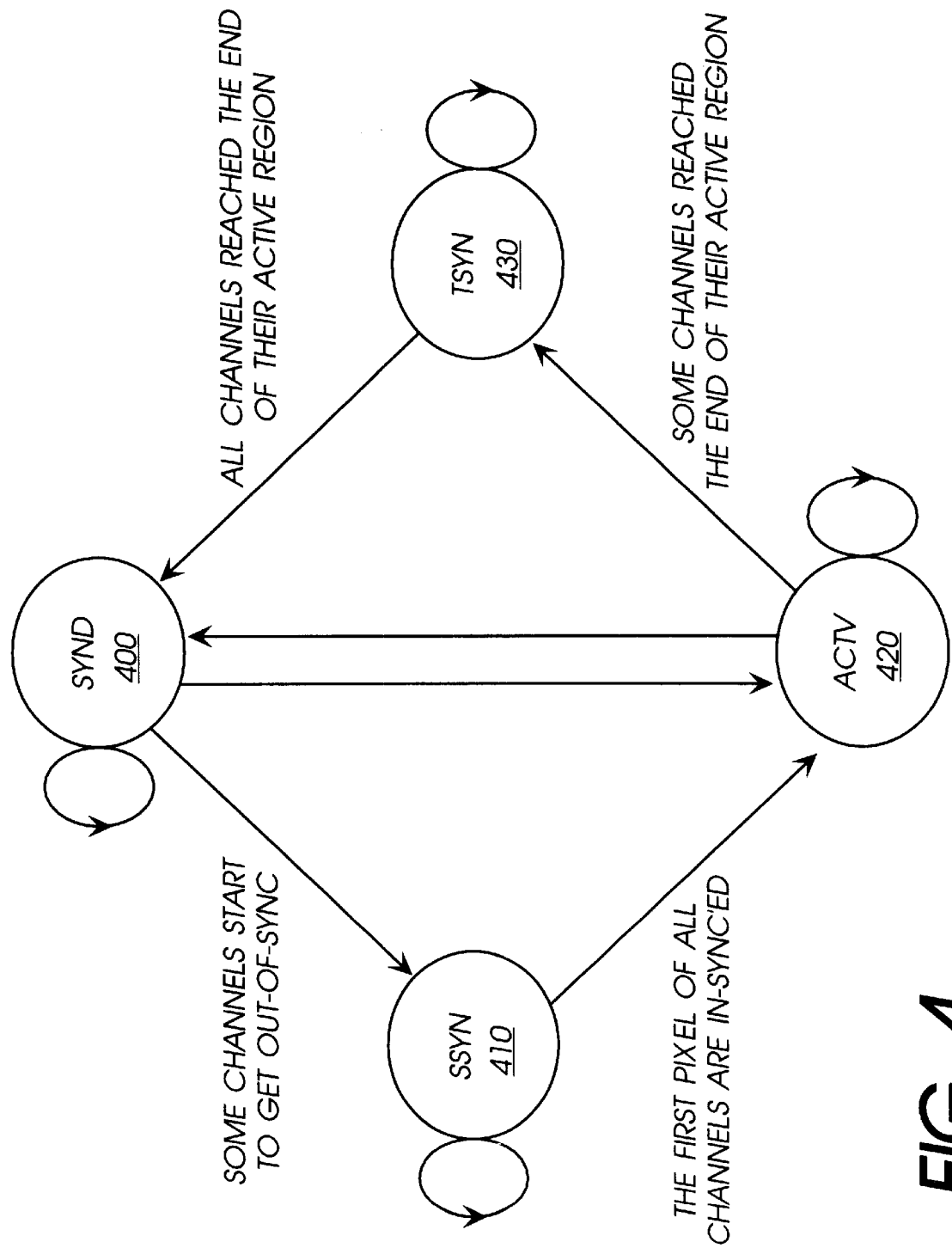
FIG. 4 is a state diagram for synchronizing data streams according to one embodiment of the invention.

FIG. 4 is a state diagram for synchronizing data streams according to one embodiment of the invention. In the embodiment described, four states are used to control and synchronize multiple independent channels. The embodiment described can be applied to any number of independent channels, which makes the architecture described herein advantageously scalable.

State 400 (SYND) is the initial state of a control circuit (e.g., pixel control circuit 240) after reset. In state 400 all channels are synchronized and may include bubbles in the associated pipeline. The control circuit remains in state 400 until at least one pixel is received with the DATA_VALID signal asserted. In response to receiving a pixel with the DATA_VALID signal asserted, the control circuit moves to state 410.

In state 410 (SSYN) at least one channel has a valid pixel that is ready for processing as indicated by the DATA_VALID signal. The control circuit halts the one or more channels with valid pixel data by asserting the PIPELINE_READY signal for the channels having the DATA_VALID signal asserted. The control circuit asserts the PIPELINE_READY to the remaining channels.

The PIPELINE_READY signal for the respective channels is asserted until the channel has valid pixel data that is ready for processing. The control circuit manages the channels with the PIPELINE_READY signal until the channels are synchronized. When the channels are synchronized, the system moves to state 420.

In state 420 (ACTV) the channels are synchronized and have entered the region of interest. The synchronized pixels from the one or more channels are processed. In state 420 one or more of the channels may have a bubble.

When data from a channel does not have the associated DATA_VALID signal asserted (e.g., a bubble), the system moves to state 400 until the channels are synchronized. When the channels are re-synchronized, the system moves back to state 420. When each channel has the associated DATA_VALID signal asserted the next pixel is processed. This flow continues until at least one of the DATA_LINESYNC signals is asserted indicating the end of the associated image line. At the end of the region of interest the system moves to state 430.

In state 430 (TSYN) at least one channel has reached the last valid pixel for a particular line. In one embodiment, the control circuit stores the last pixel of a channel and asserts the PIPELINE_READY signal for the channel. Allowing the channel to advance at this stage reduces pipeline bubbles. The PIPELINE_READY signal is deasserted when the next valid pixel is available.

During state 430 the other channels have the associated PIPELINE_READY signals asserted find the next valid and final pixel data for the line. The control circuit remains in state 430 until all channels have the DATA_VALID signal asserted.

The control circuit is not required to detect the DATA_LINESYNC for each channel because each channel is not required to provide the same number of valid pixels. For example, when one of the input channels provides pixel data in YUV format, four components ($Y_0, U, Y_1, V$) are provided. The $Y_0$ and $Y_1$ components are the luminance components of two pixels and the two pixels share the same chrominance components, U and V. As a result, the number of YUV pixels per line is even. However, other formats, such as RGB, do not require an even number of pixels per line.

Because, in one embodiment, the output image is the size of the smallest input image, only one DATA_LINESYNC from one channel is necessary. Once the last set of pixels in the region of interest is output, all channels are assumed synchronized and the control circuit returns to state 400 to process the subsequent image line.

Figure 5:
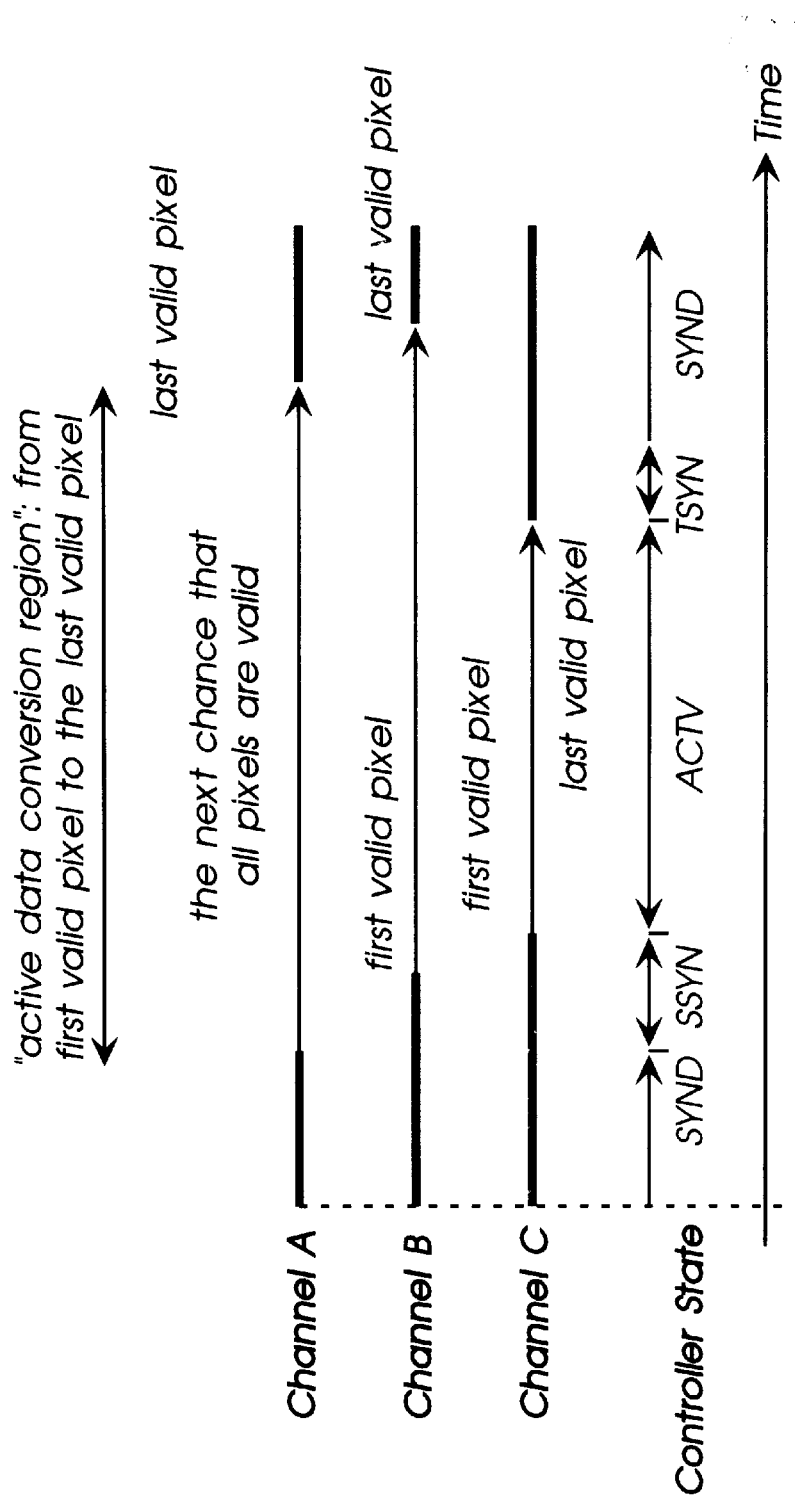
FIG. 5 is a timing diagram showing an exemplary sequence of control circuit states for synchronizing three independent data streams according to one embodiment of the invention.

FIG. 5 is a timing diagram showing an exemplary sequence of control circuit states for synchronizing three independent data streams according to one embodiment of the invention. In the example of FIG. 5, Channel A presents the first DATA_VALID pixel, which drives the control circuit to the SSYN state from the initial SYND state.

When a first pixel arrives for each channel and the control circuit enters the ACTV state. While the channels are stepping through the active data conversion regions, the first valid DATA_LINESYNC pixel arrives on Channel C. This triggers the control circuit to enter the TSYN state. When all three pixels are valid again the control circuit is in the SYND state.

Multi-Regional Graphics

The invention supports multi-regional graphics with off-screen and on-screen display buffers, which are described in greater detail below. The invention also uses multiple graphics planes to display multi-regional graphics. The off-screen display buffer is an area in memory that is not visible to a display viewer. The on-screen display buffer is an area in the memory that is periodically read and displayed to the viewer.

Figure 6:
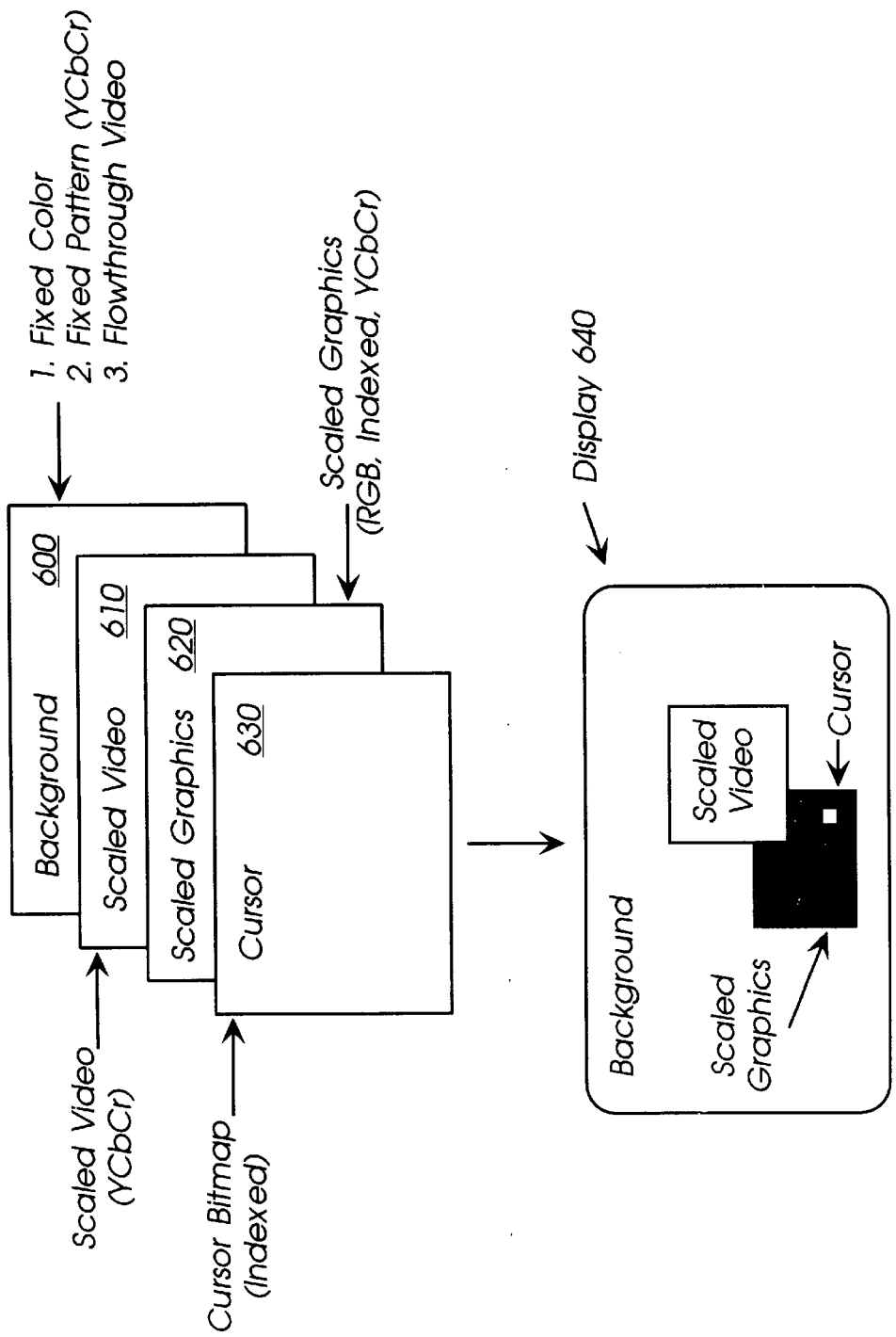
FIG. 6 is a conceptual illustration of multiple graphics planes according to one embodiment of the invention.

FIG. 6 is a conceptual illustration of multiple graphics planes according to one embodiment of the invention. FIG. 6 illustrates four graphics planes (background, scaled video, scaled graphics, and cursor); however, a different number of graphics planes can be used. Also, certain graphics formats are described for use with the respective graphics planes, but other format configurations can also be used.

Background plane 600 provides the background for the final image output to display 640. In one embodiment, background plane 600 can be a fixed color, a fixed pattern that can be tiled to fill background plane 600, or a flowthough video stream. In one embodiment background plane 600 is opaque.

Scaled video plane 610 is a video image that overlays background plane 600. For example, scaled video plane 610 can be used to provide a picture-in-picture (PIP) image on display 640. In one embodiment, scaled video plane 610 is video in the YCbCr (YUV) format; however, other formats can also be supported.

Scaled graphics plane 620 also overlays background plane 600. Scaled graphics plane 620 can also overlay scaled video plane 620. In one embodiment scaled graphics plane 620 can be either RGB, color indexed, or YCbCr formatted data. Both scaled video plane 610 and scaled graphics plane 620 can have some degree of transparency such that other images can been seen.

Cursor plane 630 overlays background plane 600, scaled video plane 610 and scaled graphics plane 620. In one embodiment, cursor plane 630 is a 64-by-64 pixel bitmap image in 4-bit indexed color format; however, other sizes and formats can also be supported. The multiple graphical planes are combined to provide a final output image to display 640.

Figure 7:
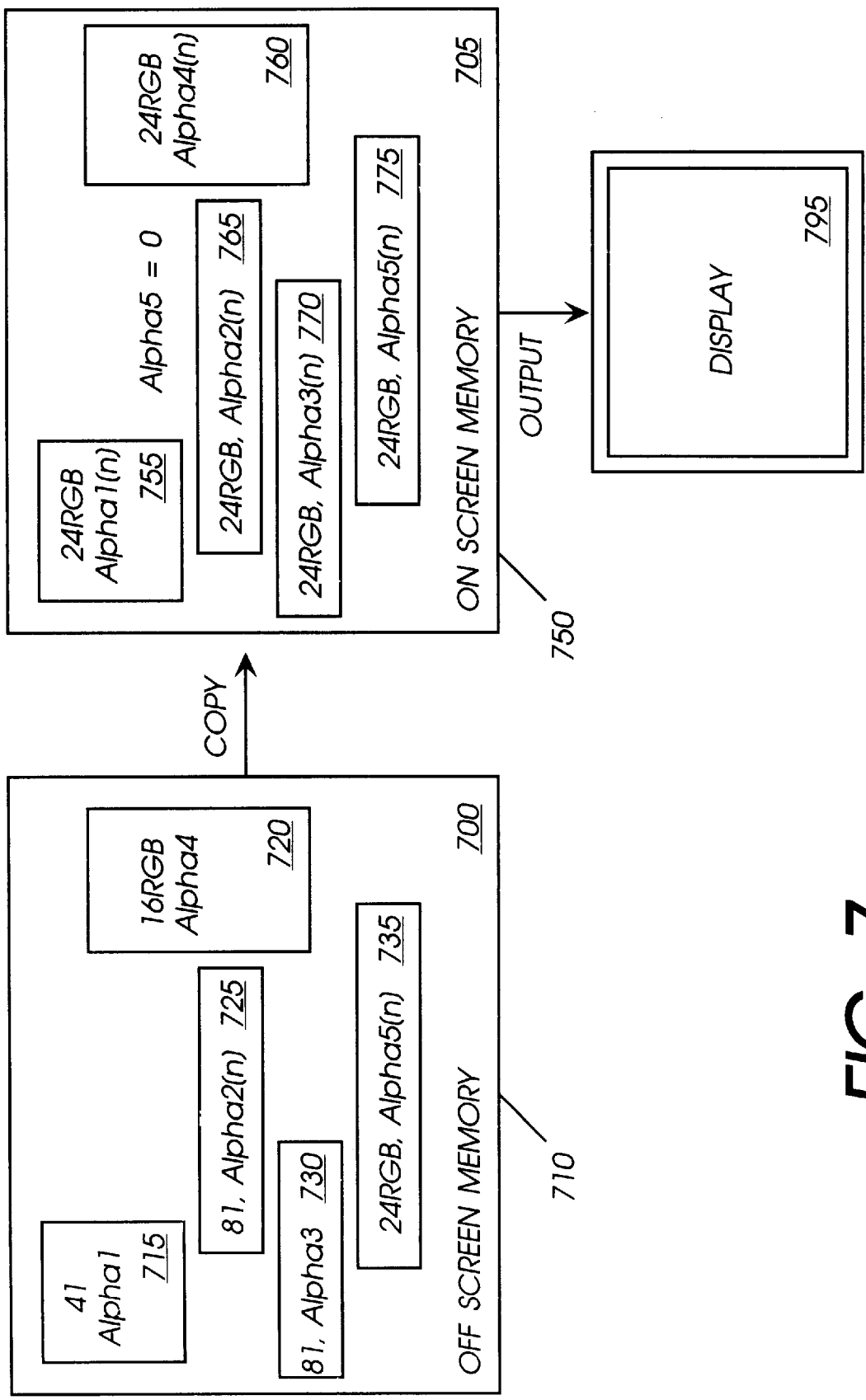
FIG. 7 is a conceptual illustration of off-screen and on-screen graphics according to one embodiment of the invention.

FIG. 7 is a conceptual illustration of off-screen and on-screen graphics according to one embodiment of the invention. The off-screen and on-screen graphics programming described with respect to FIG. 7 can be used, for example, to combine a multiple regions in different formats to generate an output image having a predetermined format. Other types of graphics combinations transformations can also be accomplished using the off-screen and on-screen graphics processing.

An image stored in off-screen memory 700 is rendered with graphics blocks that represent the various regions of the multi-regional graphics. On-screen memory 705 stores a copy of the image in off-screen memory 700 with all of the regions converted to a single graphics format. As described in greater detail below, the invention provides a graphics engine that performs color reduction or color expansion as necessary to match source and destination color formats.

Off-screen memory 700 includes data for rendering a display area having one or more color formats and alpha blending factors. In the example of FIG. 7, five graphical regions create image 710. Region 715 is represented in four-bit indexed color format with an alpha blending factor of Alpha1, region 720 is represented in 16-bit RGB color format with an alpha blending factor of Alpha4, region 725 is represented in eight-bit indexed color format with an alpha blending factor of Alpha2[n], region 730 is represented in eight-bit indexed color format with an alpha blending factor of Alpha3, and region 735 is represented in 24-bit RGB color format with an alpha blending factor of Alpha5[n].

Image 710 stored in off-screen memory 700 is copied to on-screen memory 705 to provide image 750. In the example of FIG. 7, all regions of image 750 are represented in 24-bit RGB format with 8-bit alpha blending; however, other formats can also be used. By converting image 710 having multiple graphics formats stored in off-screen memory 700 to image 750 having a single graphics format, the invention supports multi-regional graphics.

In one embodiment, during the copy operation from off-screen memory 700 to on-screen memory 705 also converts the graphical information from the format in which the information was received to a predetermined format. In one embodiment, on-screen memory 705 to which the images of off-screen memory 700 are copied is used to generate the scaled graphics plane described above. Before copying, the scaled graphics plane has an alpha blending value of zero which makes the plane transparent. Regions 715, 720, 725, 730 and 735 are copied to on-screen memory 705 and converted to a common format. The alpha blending formats are maintained during conversion to the standard format of image 750. Image 750 is then output to display 795.

Format Conversions and Blending

Figure 8:
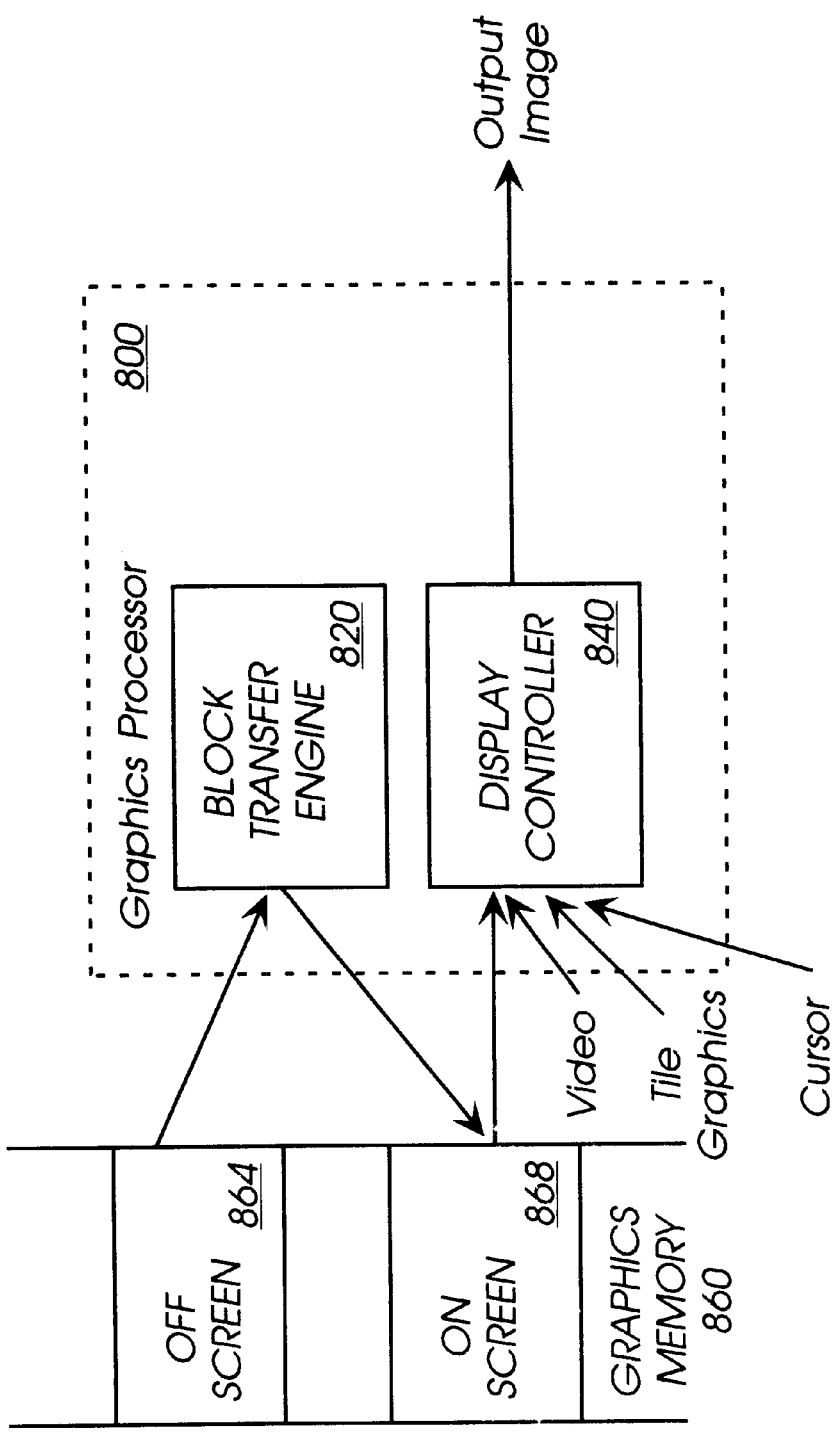
FIG. 8 is a conceptual illustration of an off-screen and on-screen data path according to one embodiment of the invention.

FIG. 8 is a conceptual illustration of an off-screen and on-screen data path according to one embodiment of the invention. In general, graphics processor 800 includes two components, block transfer engine 820 and display controller 840, that use off-screen memory 864 and on-screen memory 865 to generate an output image. Graphics processor 800 also includes other components that are not shown in FIG. 8, for example, input and output buffers.

In one embodiment, off-screen memory 864 and on-screen memory are both included in graphics memory 860. In alternative embodiments, off-screen memory 864 and on-screen memory 868 can be in different memory components, or off-screen memory 864 and on-screen memory 868 can be part of a different memory component, for example, system memory (not shown in FIG. 8).

As described above, off-screen memory 864 stores graphical images corresponding to multiple regions in an image, where the graphical images can be represented by different color formats. Block transfer engine 820 copies the data from off-screen memory 864 to on-screen memory 868. In one embodiment, block transfer engine 820 performs color expansion or color reduction as necessary while performing boolean operations on the graphical data. As a result of the transfer, on-screen memory 868 stores the scaled graphics plane for an output image. In one embodiment, the following graphical format conversions are supported.

TABLE 1

Color Format Conversions

| | | Destination | | | | | | |
|---|---|---|---|---|---|---|---|---|
| Source | 8-bit index | 8-bit alpha, 8-bit index | 8-bit RGB (3:3:2) | 15-bit RGB (5:5:5) | 16-bit RGB (5:6:5) | 24-bit RGB (8:8:8) | 4-bit alpha, 12-bit RGB | 8-bit alpha, 24-bit RGB |
| 1-bit index | X | X | X | X | X | | X | X |
| 4-bit index | X | X | X | X | X | | X | X |
| 8-bit index | X | X | X | X | X | | X | X |
| 8-bit alpha, 8-bit index | | X | X | X | X | | X | X |
| 8-bit RGB | | | X | X | X | | X | X |
| 15-bit RGB | | | X | X | X | | X | X |
| 16-bit RGB | | | X | X | X | | X | X |
| 24-bit RGB | | | | | | X | | |
| 4-bit alpha | | X | X | X | X | | X | X |
| 4-bit alpha, 12-bit RGB | | | X | X | X | | X | X |
| 8-bit alpha, 24-bit RGB | | | X | X | X | | X | X |
| YUV (YCbCr), (4:2:2) | | | X | X | X | | X | X |

Other color conversions can also be implemented.

In one embodiment, the following expansion is used to convert between color formats during a copy or other operation if the destination color depth is greater than the source color depth.

TABLE 2

Color Expansion

| SOURCE | DESTINATIONS | R | G | B |
|---|---|---|---|---|
| 8c | 12c | R2,R1,R0,R2 | G2,G1,G0,G2 | B1,B0,B1,B0 |
| 8c | 16c | R2,R1,R0,R2,R1 | G2,G1,G0,G2,G1,G0 | B1,B0,B1,B0,B1 |
| 8c | 24c | R2,R1,R0,R2,R1,R0,R2,R1 | G2,G1,G0,G2,G1,G0,G2,G1 | B1,B0,B1,B0,B1,B0,B1,B0 |
| 12c | 16c | R3,R2,R1,R0,R3 | G3,G2,G1,G0,G3,G2 | B3,B2,B1,B0,B3 |
| 12c | 24c | R3,R2,R1,R0,R3,R2,R1,R0 | G3,G2,G1,G0,G3,G2,G1,G0 | B3,B2,B1,B0,B3,B2,B1,B0 |

TABLE 2-continued

Color Expansion

| SOURCE | DESTINA-TIONS | R | G | B |
|---|---|---|---|---|
| 1i | 8i, 8c, 12c, 16c, 24c | Use foreground, background register | | |
| 4i | 8i | Align at LSB of index map | | |
| 4i, 8i | 8c, 12c, 16c, 24c | Use color look up table | | |

In the example of Table 2, bits used to represent color data in a source value are replicated where necessary to provide color data in a different format as a destination value. For example, and 8-bit source value has three red (R2, R1, R0) bits, three green (G2, G1, G0) bits, and two blue bits (B1, B0), where the bit labeled with a zero is the least significant bit. The 12-bit destination value has four red bits, four green bits, and four blue bits. The red bits are shifted to the left by one and the most significant bit of the source data (R2) is replicated as the least significant bit of the destination data. The destination green and blue bits are similarly processed.

Color reduction is performed if the source pixel map has greater color depth than the destination. In one embodiment, two modes of color reduction, linear and dither, are supported. The dither color reduction applies a 2×2 pixel error diffusion operation to the destination pixels during rounding. The quantization error due to rounding is weighted according to the destination pixel location with respect to origin and pitch. If the result is less than one, the destination pixel color value is increased by one. In one embodiment, the following operations are used for linear color reduction.

TABLE 3

Color reduction

| Source | Destination | Operation |
|---|---|---|
| 4 | 2 | (x[4] − (x[4] >> 3) + 2 ^ 0) >> 1 |
| 4 | 2 | (x[4] − (x[4] >> 2) + 2 ^ 1) >> 2 |
| 5 | 3 | (x[5] − (x[5] >> 3) + 2 ^ 1) >> 2 |
| 5 | 2 | (x[5] − (x[5] >> 2) + +2 ^ 2) >> 3 |
| 5 | 4 | (x[5] − (x[5] >> 4) + 2 ^ 0) >> 1 |
| 6 | 3 | (x[6] − (x[6] >> 3) + 2 ^ 2) >> 3 |
| 6 | 4 | (x[6] − (x[6] >> 4) + 2 ^ 1) >> 2 |
| 8 | 2 | (x[8] − (x[8] >> 2) + 2 ^ 5) >> 6 |
| 8 | 3 | (x[8] − (x[8] >> 3) + 2 ^ 4) >> 5 |
| 8 | 4 | (x[8] − (x[8] >> 4) + 2 ^ 3) >> 4 |
| 8 | 5 | (x[8] − (x[8] >> 5) + 2 ^ 2) >> 3 |
| 8 | 6 | (x[8] − (x[8] >> 6) + 2 ^ 1) >> 2 |

In one embodiment, the following conversion is used to convert YCbCr to 16-bit RGB images.

$$\begin{bmatrix} R \\ G \\ B \end{bmatrix} = \begin{bmatrix} 1.164 & 1.596 & 0 \\ 1.164 & -0.813 & -0.392 \\ 1.164 & 0 & 2.017 \end{bmatrix} \times \begin{bmatrix} (Y-16) \\ (Cr-128) \\ (Cb-128) \end{bmatrix}$$

Similar conversions can be used for YCbCr to other RGB formats.

Display controller reads the scaled graphics plane from on-screen memory 868 as well as scaled video, background and cursor data from memory 860 to generate an output image. The output image is output to a display device (not shown in FIG. 8) to be displayed.

Figure 9:
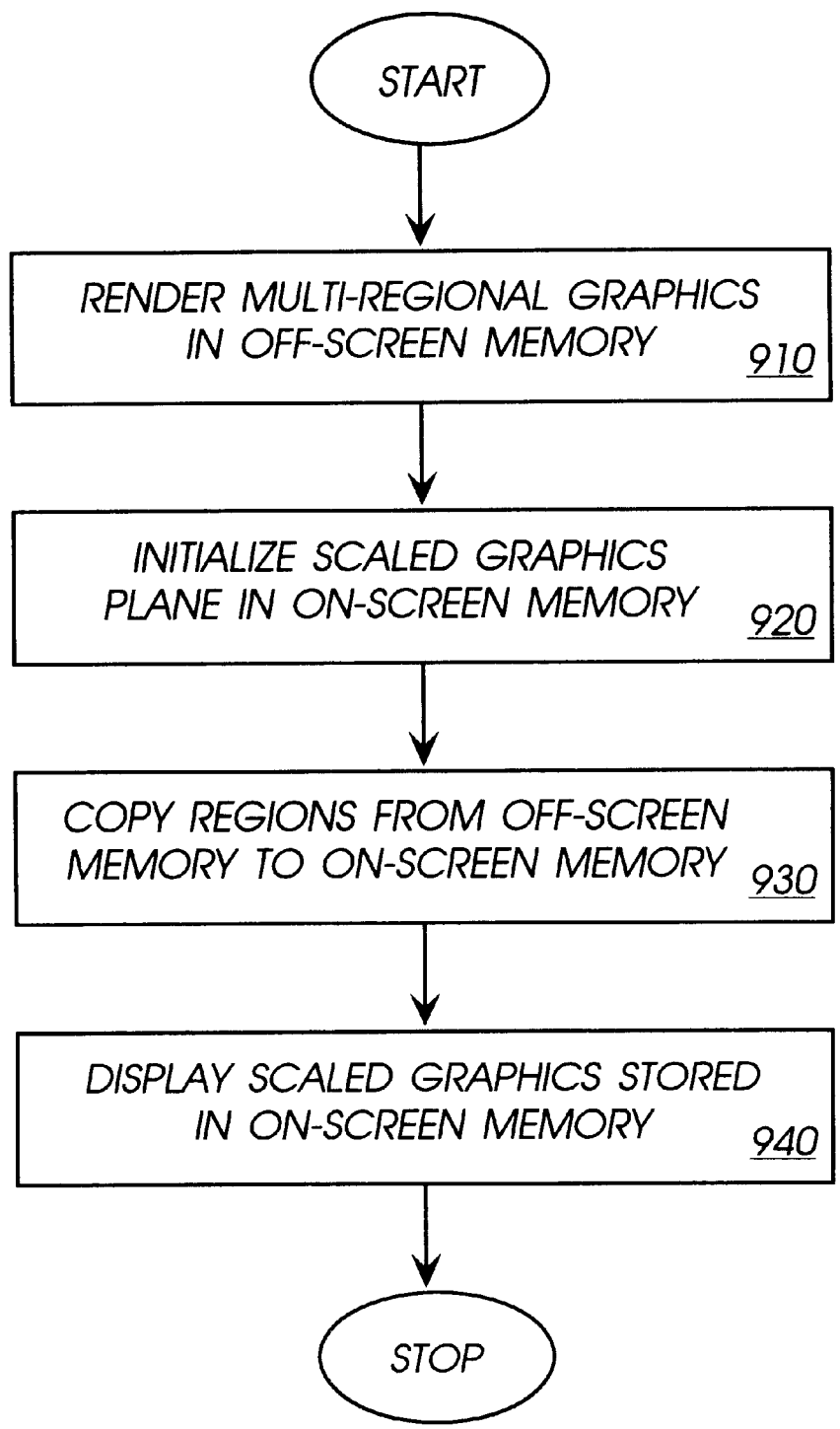
FIG. 9 is a flow diagram for providing multi-regional graphics according to one embodiment of the invention.

FIG. 9 is a flow diagram for providing multi-regional graphics according to one embodiment of the invention. In the example of FIG. 9, the multi-regional graphics are provided as part an output having multiple graphics planes. However, multiple graphics planes are not required to provide multi-regional graphics as described.

Multi-regional graphics are rendered in off-screen memory at 910. The multi-regional graphics includes one or more regions, each of which can have a different color format, with or without alpha factors.

The scaled graphics plane in on-screen memory is initialized at 920. In one embodiment, initialization is accomplished by setting all of the pixels of the scaled graphics plane to an alpha value of zero (transparent). Thus, the scaled graphics plane is transparent when the regions of the multi-regional graphics are stored in off-screen memory.

The regions of the multi-regional graphics are copied from off-screen memory to on-screen memory. In one embodiment, the color format of the regions are converted, if necessary, to a common format. The color conversions can be accomplished as described above. The alpha values corresponding to the regions in off-screen memory are used to generate appropriate alpha values in on-screen memory such that the transparency of the regions is maintained.

The scaled graphics plane stored in on-screen memory is displayed at 940. The display can have multiple planes as described above, or the scaled graphics plane can be the only plane used to generate an output image.

Block Transfer Operations

Figure 10:
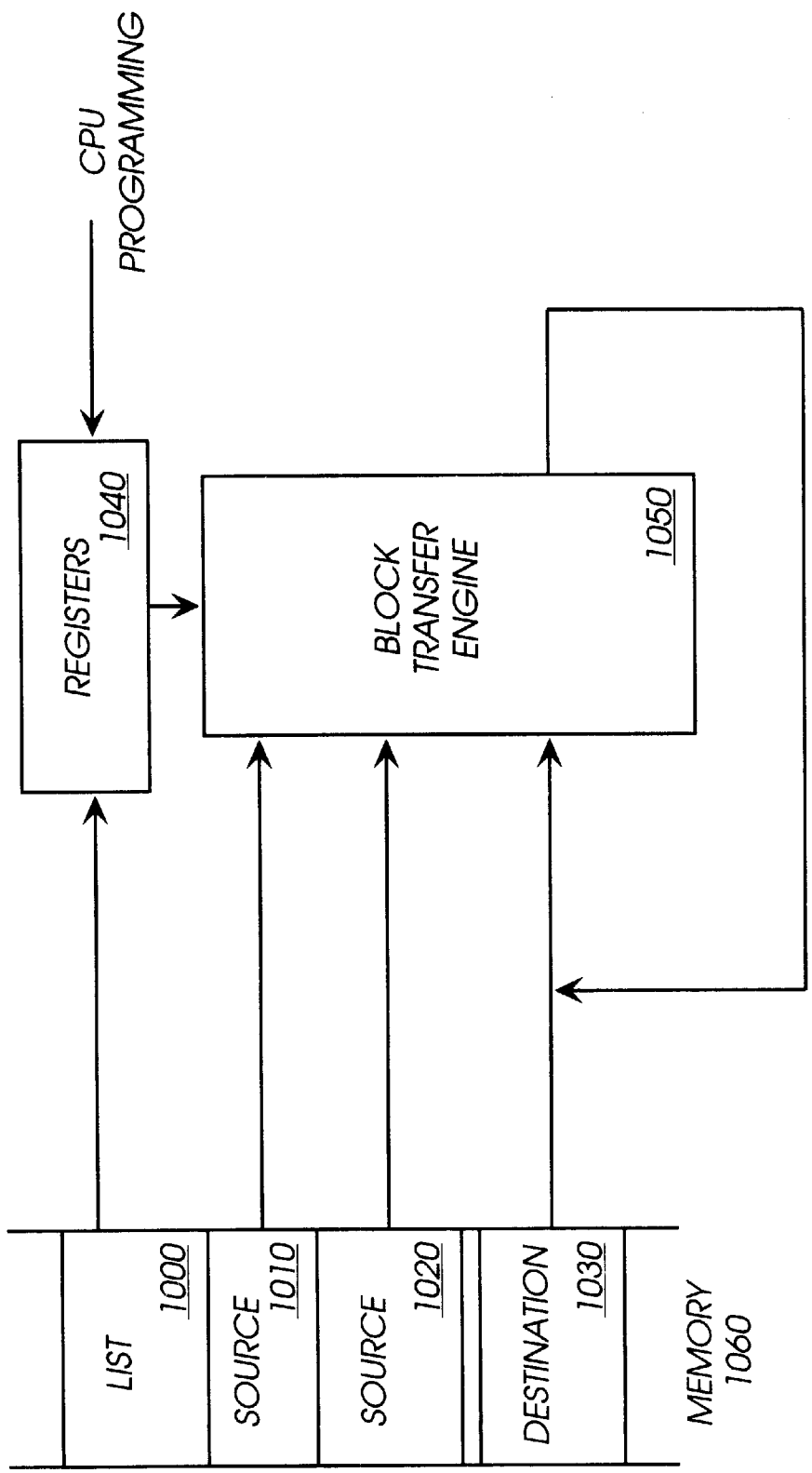
FIG. 10 is a block diagram of a data path according to one embodiment of the invention.

FIG. 10 is a block diagram of a data path according to one embodiment of the invention. As described above, block transfer engine 1050 copies graphics data from off-screen memory to on-screen memory. In one embodiment, block transfer engine 1050 performs color reduction/expansion, a logical operation and alpha blending on one or more sets of source data.

Registers 1040 represents a set of registers that can be used to control block transfer engine 1050. In one embodiment registers 1040 include 24 registers; however, any number of registers can be used. Registers 1040 are updated by a CPU or other device (not shown in FIG. 10) or registers 1040 can be updated automatically from list 1000 in memory 1060. Updating registers 1040 from list 1000 operates as a linked list of registers described in greater detail below. Controlling block transfer engine 1050 with a linked list of registers reduces processing overhead of a system CPU or other device.

Source 1010 and source 1020 represent graphical regions of the same size residing in memory 1060. Source 1010 and source 1020 provide input to block transfer engine 1050. Block transfer engine 1050 operates on the source graphical data to generate an output that is stored in destination 1030, which is also fed back into block transfer engine 1050. The feed back allows block transfer engine 1050 to perform multiple operations without writing a result to memory 1060 and reading the result for the next operation.

In one embodiment block transfer engine 1050 supports all 256 possible boolean raster operations for up to two source bitmaps and one destination bitmap. Different combinations of input bitmaps, output bitmaps and operations can also be supported. In one embodiment, the operation codes are those used in Windows® products available from Microsoft Corporation of Redmond, Wash.; however other operation codes can also be used.

Programmability and Pacing of Graphical Processing

In one embodiment, the invention supports a linked list feature where a set of graphical data instructions are loaded into memory to be executed by the block transfer engine. The instructions are fetched and executed by the block transfer engine without intervention by the CPU or other processing device.

The operations are defined by programming registers read by the block transfer engine, for example, registers 1040 of FIG. 10. Multiple operations are linked by a special purpose register referred to as the Link Address Register.

Figure 11:
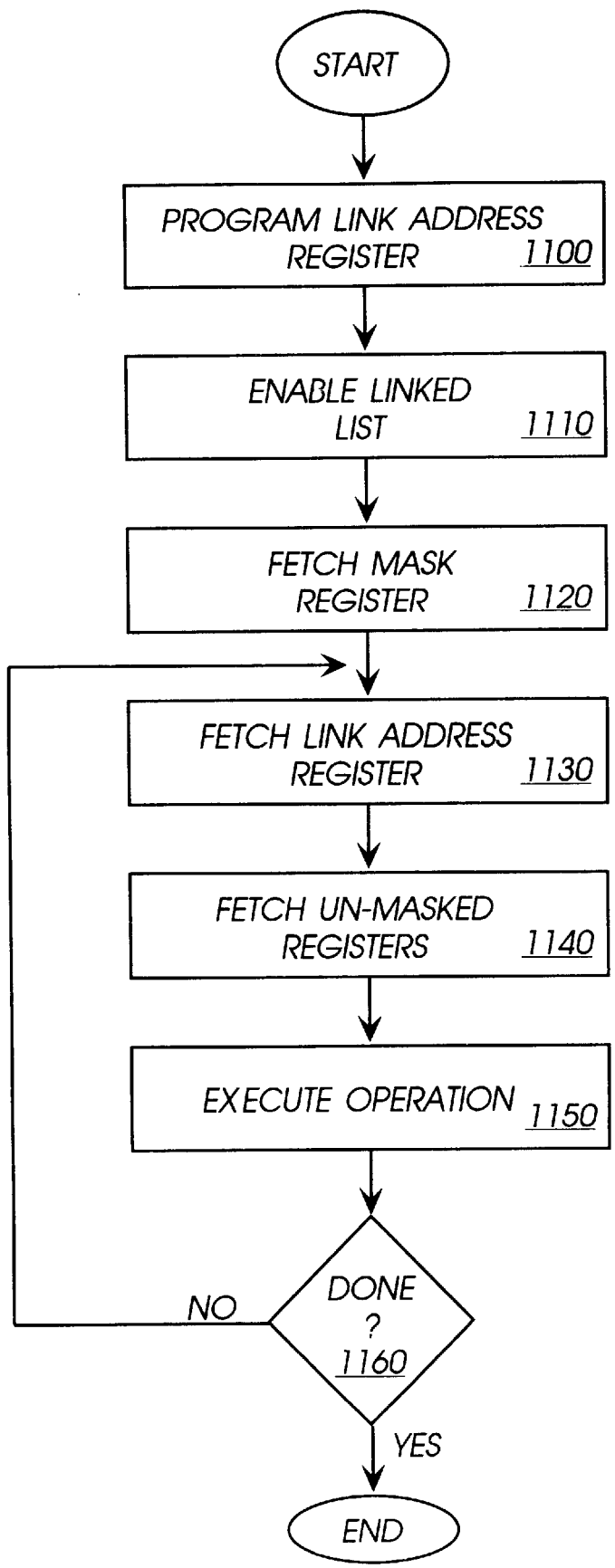
FIG. 11 a flow diagram for performing register linked list operations according to one embodiment of the invention.

FIG. 11 a flow diagram for performing register linked list operations according to one embodiment of the invention. A Link Address Register is programmed at 1100. Linked list programming is enabled at 1110. In one embodiment, a bit is set in a control register to indicate whether linked list programming is enabled.

A Mask Register is fetched at 1120. In one embodiment, the Mask Register is used to determine a subset of registers that are accessed by a corresponding operation. By accessing a subset of registers, only the registers that are necessary for an operation are accessed, which improves performance of graphics operations. In one embodiment, the Mask Register is configured as described below; however, other configurations can also be used.

TABLE 4

Mask Register.

Bit Description

0  Command register. When the command register is written, the block transfer result is shared, unless suspended.
1  Program line pace register
2  Interrupt status register
3  Status register
4  Destination Channel Configuration Register
5  Source 1 Channel Configuration Register
6  Source 0 Channel Configuration Register
7  Alpha Parameter Configuration Register
8  Background Register for Source 1
9  Foreground or Global Color Register for Source 1
10 Background Register for Source 0
11 Foreground or Global Color Register for Source 0
12 Height and Width register
13 Pitch for Destination
14 Pitch for Source 1
15 Pitch for Source 0
16 Destination Right Address Register
17 Destination Left Address Register
18 Source 1 Right Address Register
19 Source 1 Left Address Register
20 Source 0 Right Address Register
21 Source 0 Left Address Register
22 Link Address Register
23 Configure the Program Register Bit 1 of the Mask Register corresponds to the Pace register. The Pace register is used when graphical operations are paced or triggered by an event. Pacing can be used, for example, to provide animation of graphical sequences without processor intervention. In one embodiment, when operations are paced graphics operations are suspended until the occurrence of a display event or external stimulus. Display events are, for example, the display of a specified scan line or vertical sync. External events are, for example, events that are flagged by the device writing to a control register.

Bit 2 of the Mask Register corresponds to the Interrupt Status Register. In one embodiment, the Interrupt Status Register indicates whether an interrupt is generated when a block transfer is completed, whether an interrupt is generated when a chain of block transfers is completed, whether the graphics engine is provided with sufficient memory bandwidth, and bits to mask off certain predetermined interrupts. Other configurations can also be used.

Bit 3 of the Mask Register corresponds to the Status Register. In one embodiment, the Status Register is used for controlling paced operations and indicating the status of block transfer operations. Other configurations can also be used.

Bit 4 of the Mask Register corresponds to the Destination Channel Configuration Register. In one embodiment the Destination Channel Configuration Register indicates the format of the destination data, whether the region is scanned from right to left or left to right, the number of lines in the region, and dither information. Other information can also be included in the Destination Channel Configuration Register.

Bit 5 of the Mask Register corresponds to the Source 1 Channel Configuration Register. In one embodiment the Source 1 Channel Configuration Register indicates the format of the source data, whether the region is scanned from right to left or left to right, the number of lines in the region, whether the source uses a global color register, and the method used to reduce color when necessary. Other information can also be included in the Source 1 Channel Configuration Register.

Bit 6 of the Mask Register corresponds to the Source 0 Channel Configuration Register. In one embodiment the Source 0 Channel Configuration Register indicates the format of the source data, whether the region is scanned from right to left or left to right, the number of lines in the region, whether the source uses a global color register, and the method used to reduce color when necessary. Other information can also be included in the Source 0 Channel Configuration Register.

Bit 7 corresponds to the Alpha Parameter Configuration Register. In one embodiment the Alpha Parameter Configuration Register indicates a global alpha value for a source array, a global alpha value for the destination array, and parameters for blending equations. The Alpha Parameter Configuration Register provides support for programmable alpha blending.

Bit 8 corresponds to the Background Register for Source 1. In one embodiment, the Background Register for Source 1 specifies a background registers for when Source 1 is in one bit per pixel format. Bit 9 corresponds to the Foreground or Global Color Register for Source 1. In one embodiment, the Foreground or Global Color Register for Source 1 specifies a foreground color when Source 1 is in one bit per pixel format, or the Foreground or Global Color Register for Source 1 indicates a global color for Source 1. Other formats can also be used.

Bit 10 corresponds to the Background Register for Source 0. In one embodiment, the Background Register for Source 0 specifies a background registers for when Source 0 is in one bit per pixel format. Bit 11 corresponds to the Foreground or Global Color Register for Source 0. In one embodiment, the Foreground or Global Color Register for Source 0 specifies a foreground color when Source 0 is in one bit per pixel format, or the Foreground or Global Color Register for Source 0 indicates a global color for Source 0. Other formats can also be used.

Figure 12:
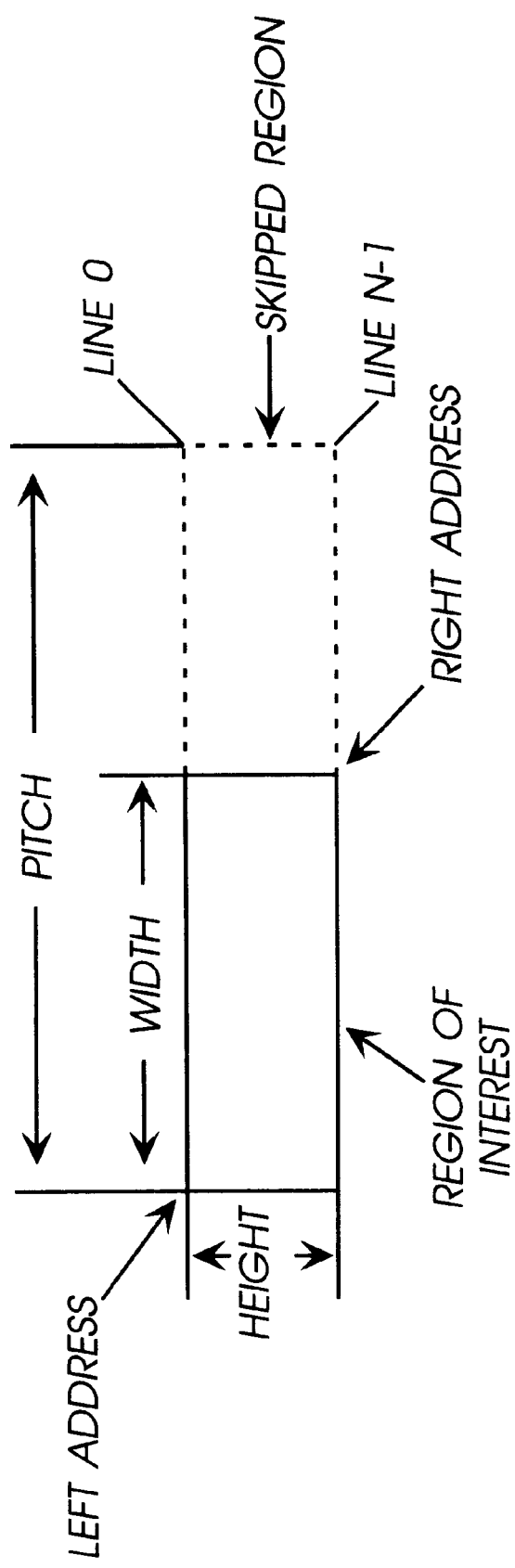
FIG. 12 illustrates parameters for a region of interest according to one embodiment of the invention.

Bits 12–21 define a region of interest for Source 0, Source 1 and Destination. FIG. 12 illustrates parameters for a region of interest according to one embodiment of the invention. The region of interest illustrated in FIG. 12 includes N lines bounded by the height, width, left address and right address. In one embodiment, the pitch is twice the width. The Pitch can be used to indicate the distance between the end of the region of interest and the beginning of the subsequent line.

Bit 22 corresponds to the Link Address Register. In one embodiment, the Link Address Register stores a starting address for a linked list. In one embodiment, Bit 23 indicates whether the program register is to be configured.

Referring back to FIG. 11, if indicated by the Mask Register, the Link Address Register is fetched at 1130. As described above, the Link Address Register indicates the address of the starting address of the linked list. The starting address of the linked list stores an operation to be performed by the block transfer engine.

The values stored in the un-masked registers as indicated by the Mask Register are fetched at 1140. The un-masked registers store data to be used in the operation to be performed. By fetching only the values in the un-masked registers, only the necessary values are fetched, which improves performance as compared to fetching the values in all of the registers indicated by the Mask Register.

The operation is executed at 1150. If the liked list of operations is not complete at 1160, the address of the subsequent operation is fetched. Otherwise, the process in complete. In one embodiment, the fetching and execution indicated by 1130, 1140 and 1150 are performed for each operation in the linked list of operations.

Figure 13:
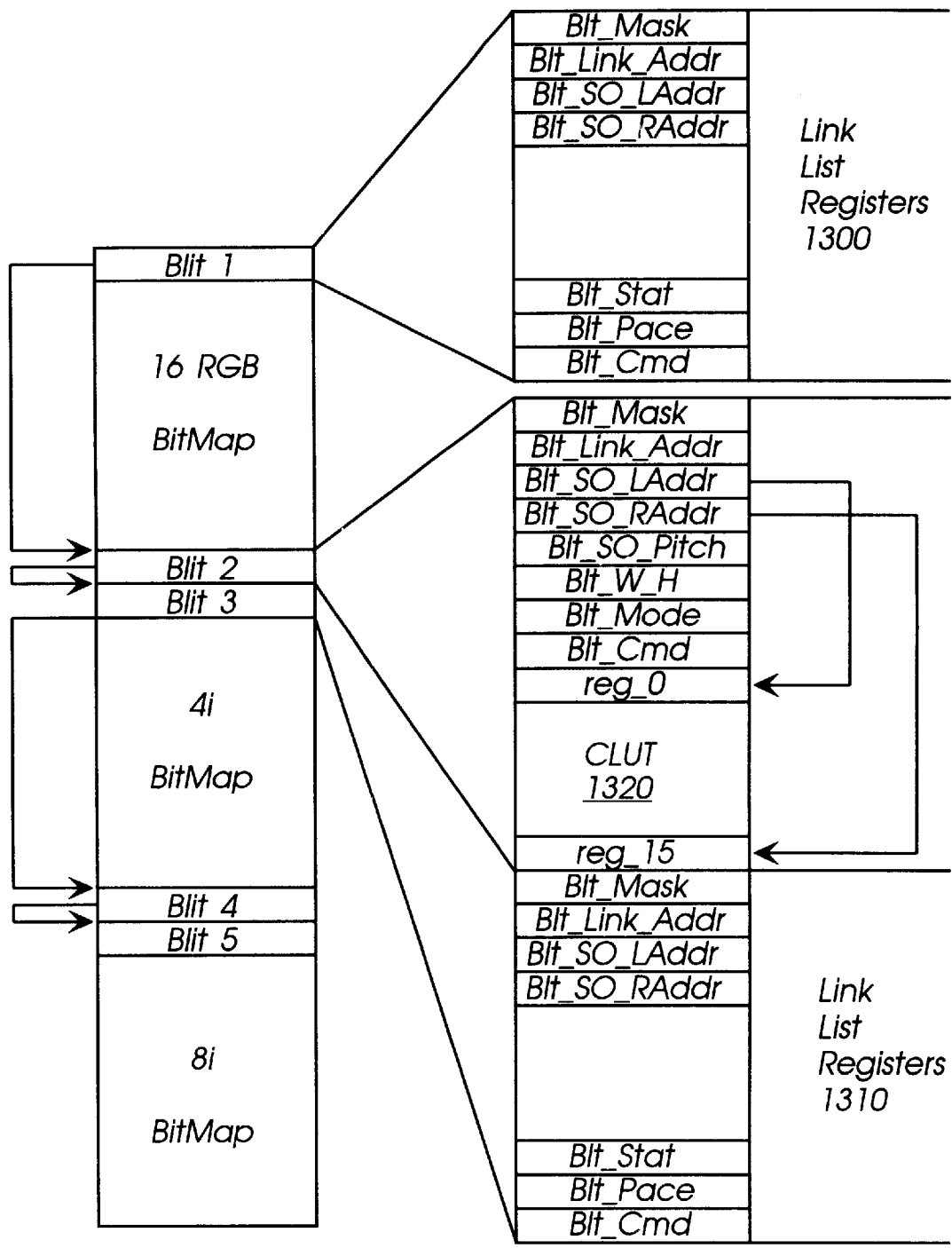
FIG. 13 is a conceptual example of a linked list of operations according to one embodiment of the invention.

FIG. 13 is a conceptual example of a linked list of operations according to one embodiment of the invention. In the example of FIG. 13, graphical operations are referred to as "blits" or "BLTs" (Block Transfers). The example of FIG. 13 describes five linked blit operations; however, any number of operations can be linked together.

Blit 1 causes Link List Registers 1300 to be read. In one embodiment, the registers indicated by the Mask Register (Blt_Mask) as described above are read to execute Blit 1. In the example of FIG. 13, Blit 1 operates on a 16-bit RGB bitmap; however, other color formats can also be used. Blit 2 is executed after Blit 1 is executed. In the example of FIG. 13, Blit 2 accesses data in a different set of registers indicated by the Mask Register.

Blit 2 includes access to color look up table (CLUT) 1320. Blit 3 is executed using data from Link List Registers 1310 and operates on a 4-bit indexed color bitmap. Similarly, Blit 4 and Blit 5 are executed using data from Link List Registers 1310 or a different set of registers as indicated by the Mask Register. In the example of FIG. 13, Blit 4 and Blit 5 operates on and 8-bit indexed bitmap.

Programmable Alpha Blending

In one embodiment, graphical data is converted to RGB format prior to operations being performed and two alpha blending modes are supported. In 8-bit alpha blending mode values between 128 (opaque) and 0 (transparent) are used to provide alpha blending. In 4-bit alpha blending mode values between 15 (opaque) and 0 (transparent) are used to provide alpha blending. Alpha blending can be applied to each color component of each pixel or on a pixel-by-pixel basis.

Figure 14:
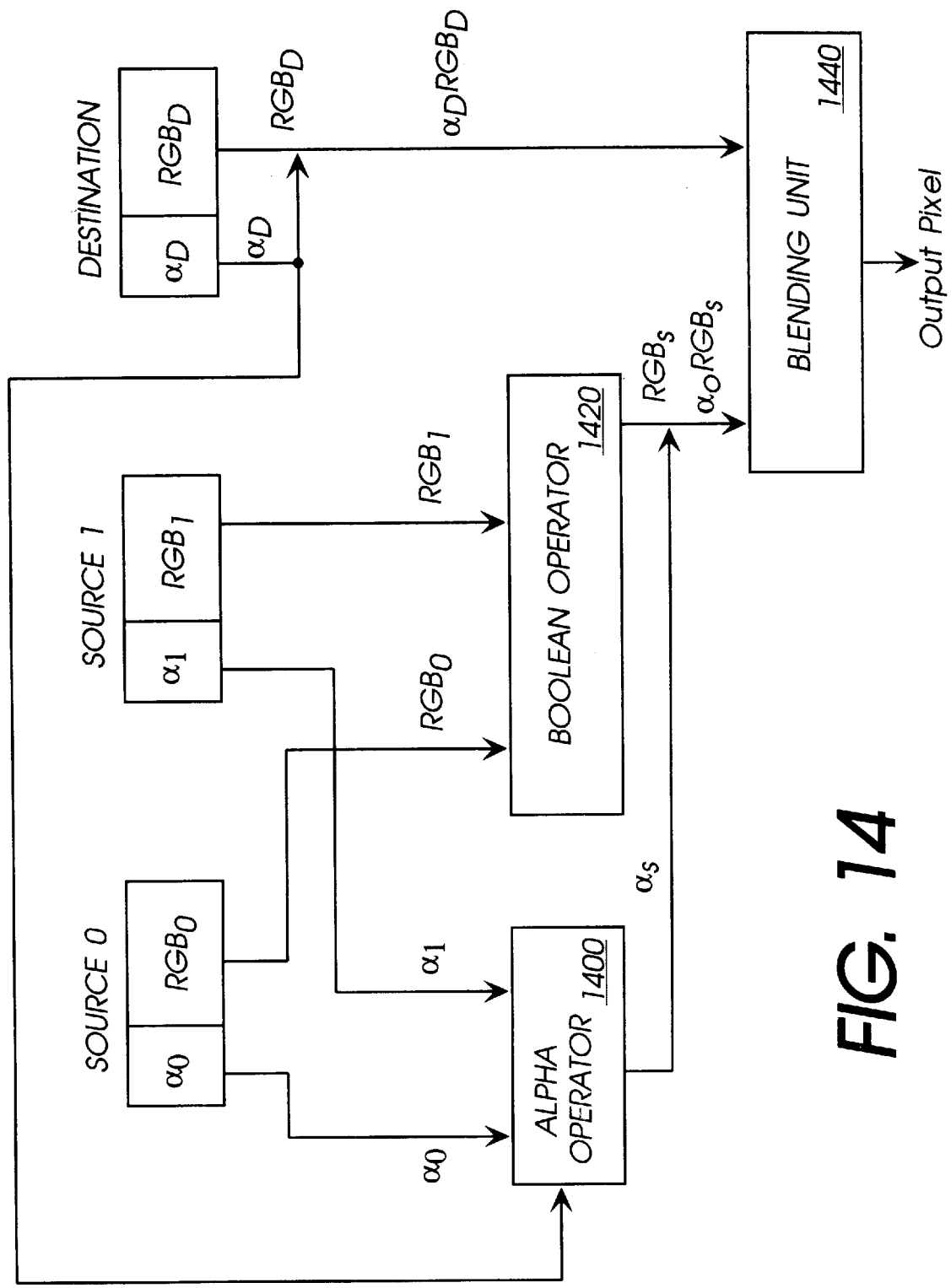
FIG. 14 is a block diagram of components to provide programmable alpha blending according to one embodiment of the invention.

FIG. 14 is a block diagram of components to provide programmable alpha blending according to one embodiment of the invention. The components of FIG. 13 provide alpha blending between source and destination pixel maps. In one embodiment, both 8-bit and 4-bit alpha blending is supported. In alternative embodiments, other alpha blending modes can be supported.

In the example of FIG. 14, Source 0 is represented by an alpha value ($\alpha_0$) and an RGB value ($RGB_0$). Similarly, Source 1 is represented by $\alpha$, and $RGB_1$, and Destination is represented by $\alpha_D$ and $RGB_D$. Thus, Source 0, Source 1 and Destination have been converted to RGB format prior to the boolean operation described with respect to FIG. 14.

Alpha operator 1400 receives $\alpha_0$, $\alpha_D$ and $\alpha_D$. Alpha operator 1400 is programmable by a control circuit or other device (not shown in FIG. 14) to select one of the alpha values for use in generating an output pixel. In one embodiment alpha operator 1400 is a multiplexor; however, other devices can be used. In an alternative embodiment, alpha operator 1400 generates an output alpha value based on the input alpha values that is not necessarily equal to one of the input alpha values. Alpha operator 1400 generates $\alpha_S$ as an output alpha value.

Boolean operator 1420 receives $RGB_0$ and $RGB_1$ as input values. Boolean operator 1420 performs one or more boolean operations on $RGB_0$ and $RGB_1$ to generate $RGB_S$. The output values from alpha operator 1400 and boolean operator 1420, $\alpha_S$ and $RGB_S$, respectively are combined to provide an input to blending unit 1440.

In one embodiment blending unit 1440 receives $\alpha_S RGB_S$ and $\alpha_D RGB_D$ as input values and performs a blending operation. For example, if $\alpha_S RGB_S$ overlays $\alpha_D RGB_D$, blending unit 1440 generates an output pixel that has an appropriate blending of the source and destination pixels.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method of generating multi-regional graphics, the method comprising:
   rendering a multi-regional image in an off-screen memory, wherein the multi-regional image has at least two regions represented by at least two color formats;
   copying the multi-regional image to an on-screen memory, wherein the regions of the multi-regional image are converted to a common color format during the copy operation; and
   displaying the multi-regional image stored in on-screen memory.

2. The method of claim 1 wherein displaying the multi-regional image comprises displaying an output image having multiple planes wherein one of the planes includes the multi-regional image stored in on-screen memory.

3. The method of claim 1 wherein the copying of the multi-regional image to the on-screen memory is included in a linked list of graphical operations.

4. The method of claim 3 wherein executing the linked list of operations comprises:
   accessing information stored in a mask register;
   accessing registers indicated by the mask register;
   performing an operation based, at least in part, on the registers accessed.

5. The method of claim 4 wherein the linked list of operations is paced based, at least in part, on a predetermined event.

6. An apparatus for generating multi-regional graphics, the apparatus comprising:
   means for rendering a multi-regional image in an off-screen memory, wherein the multi-regional image has at least two regions represented by at least two color formats;
   means for copying the multi-regional image to an on-screen memory, wherein the regions of the multi-regional image are converted to a common color format during the copy operation; and
   means for displaying the multi-regional image stored in on-screen memory.

7. The apparatus of claim 6 wherein the means for displaying the multi-regional image further comprises means for displaying an output image having multiple planes wherein one of the planes includes the multi-regional image stored in on-screen memory.

8. The apparatus of claim 6 wherein the means for copying of the multi-regional image to the on-screen memory further comprises means for performing a linked list of operations.

9. The apparatus of claim 8 wherein the means for performing the linked list of operations comprises:
   means for accessing information stored in a mask register;
   means for accessing registers indicated by the mask register;
   means for performing an operation based, at least in part, on the registers accessed.

10. The apparatus of claim 9 wherein the linked list of operations is paced based, at least in part, on a predetermined event.

11. A machine-readable medium having stored thereon sequences of instructions that when executed by one or more devices cause the one or more devices to:
   render a multi-regional image in an off-screen memory, wherein the multi-regional image has at least two regions represented by at least two color formats;
   copy the multi-regional image to an on-screen memory, wherein the regions of the multi-regional image are converted to a common color format during the copy operation; and
   display the multi-regional image stored in on-screen memory.

12. The machine-readable medium of claim 11 wherein the sequence of instructions that cause the one or more devices to display the multi-regional image further comprises sequences of instructions that when executed cause the one or more devices to display an output image having multiple planes wherein one of the planes includes the multi-regional image stored in on-screen memory.

13. The machine-readable medium of claim 11 wherein the sequences of instructions that cause the one or more devices to copy of the multi-regional image to the on-screen memory is included in a sequence of instructions that when executed cause the one or more devices to perform a linked list of graphical operations.

14. The machine-readable medium of claim 13 wherein the sequences of instructions that cause the one or more devices to execute the linked list of operations further comprises sequences of instructions that when executed by the one or more devices cause the one or more devices to:
   access information stored in a mask register;
   access registers indicated by the mask register;
   perform an operation based, at least in part, on the registers accessed.

15. The machine-readable medium of claim 14 wherein the linked list of operations is paced based, at least in part, on a predetermined event.

* * * * *